(12) United States Patent
Trautman et al.

(10) Patent No.: US 10,078,359 B2
(45) Date of Patent: Sep. 18, 2018

(54) METHOD, SYSTEM, AND APPARATUS FOR DYNAMIC THERMAL MANAGEMENT

(71) Applicant: Intel Corporation, Santa Clara, CA (US)

(72) Inventors: Mark A. Trautman, Aloha, OR (US); Muralidhar Tirumala, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/930,078

(22) Filed: Nov. 2, 2015

(65) Prior Publication Data

US 2016/0054787 A1     Feb. 25, 2016

Related U.S. Application Data

(63) Continuation of application No. 14/040,257, filed on Sep. 27, 2013, now Pat. No. 9,116,690, which is a continuation of application No. 13/681,837, filed on Nov. 20, 2012, now Pat. No. 9,182,800, which is a continuation of application No. 12/592,302, filed on Nov. 23, 2009, now Pat. No. 8,316,250, which is a continuation of application No. 11/476,955, filed on Jun. 28, 2006, now abandoned.

(51) Int. Cl.
| | |
|---|---|
| *G06F 1/26* | (2006.01) |
| *G06F 1/32* | (2006.01) |
| *G06F 9/48* | (2006.01) |
| *G06F 9/50* | (2006.01) |

(52) U.S. Cl.
CPC .............. *G06F 1/3287* (2013.01); *G06F 1/32* (2013.01); *G06F 1/3203* (2013.01); *G06F 1/324* (2013.01); *G06F 1/3293* (2013.01); *G06F 9/4856* (2013.01); *G06F 9/5088* (2013.01); *G06F 9/5094* (2013.01); *Y02D 10/126* (2018.01); *Y02D 10/22* (2018.01); *Y02D 10/24* (2018.01); *Y02D 10/32* (2018.01)

(58) Field of Classification Search
CPC .... G06F 1/3203; G06F 1/3287; G06F 1/3293; G06F 9/4856; G06F 9/5088; G06F 1/3296

See application file for complete search history.

(56) References Cited

U.S. PATENT DOCUMENTS

| | | |
|---|---|---|
| 6,908,227 B2 | 6/2005 | Rusu et al. |
| 7,043,405 B2 | 5/2006 | Orenstien et al. |
| 7,330,983 B2 | 2/2008 | Chaparro et al. |
| 7,389,195 B2 | 6/2008 | Capps, Jr. et al. |
| 7,409,570 B2 | 8/2008 | Suzuoki |
| 7,412,353 B2 | 8/2008 | Borkar et al. |
| 7,437,581 B2 | 10/2008 | Grochowski et al. |
| 7,535,020 B2 | 5/2009 | Yoshida et al. |
| 7,552,346 B2 | 6/2009 | Aguilar, Jr. et al. |
| 7,596,430 B2 | 9/2009 | Aguilar, Jr. et al. |
| 7,698,114 B2 | 4/2010 | Hamann et al. |

(Continued)

*Primary Examiner* — Xuxing Chen
(74) *Attorney, Agent, or Firm* — Patent Capital Group

(57) ABSTRACT

A method, apparatus, article of manufacture, and system, the method including, in some embodiments, processing a computational load by a first core of a multi-core processor, and dynamically distributing at least a portion of the computational load to a second core of the multi-core processor to reduce a power density of the multi-core processor for the processing of the computational load.

20 Claims, 10 Drawing Sheets

(56) References Cited

U.S. PATENT DOCUMENTS

| | | |
|---|---|---|
| 8,037,445 B2 | 10/2011 | Poirier et al. |
| 8,037,893 B2 | 10/2011 | Aguilar, Jr. et al. |
| 2002/0143488 A1 | 10/2002 | Cooper et al. |
| 2003/0110012 A1 | 6/2003 | Orenstien et al. |
| 2004/0037346 A1 | 2/2004 | Rusu et al. |
| 2004/0128663 A1 | 7/2004 | Rotem |
| 2005/0050373 A1 | 3/2005 | Orenstien et al. |
| 2005/0278520 A1 | 12/2005 | Hirai et al. |
| 2005/0278555 A1 | 12/2005 | Chaparro et al. |
| 2006/0095913 A1 | 5/2006 | Bodas et al. |
| 2006/0171244 A1 | 8/2006 | Ando |
| 2007/0074011 A1 | 3/2007 | Borkar et al. |
| 2007/0098037 A1 | 5/2007 | Hamann et al. |
| 2007/0106428 A1 | 5/2007 | Omizo et al. |
| 2007/0260895 A1 | 11/2007 | Aguilar et al. |

METHOD, SYSTEM, AND APPARATUS FOR DYNAMIC THERMAL MANAGEMENT

This application is a continuation of U.S. patent application Ser. No. 14/040,257 filed Sep. 27, 2013, issued as U.S. Pat. No. 9,116,690 on Aug. 25, 2015, which is a continuation of U.S. patent application Ser. No. 13/681,837 filed on Nov. 20, 2012, issued as U.S. Pat. No. 9,182,800 on Nov. 10, 2015, which is a continuation of U.S. patent application Ser. No. 12/592,302 filed on Nov. 23, 2009, issued as U.S. Pat. No. 8,316,250 on Nov. 20, 2012, which is a continuation of U.S. patent application Ser. No. 11/476,955 filed on Jun. 28, 2006.

BACKGROUND

A device, system, platform, or operating environment may include more than one processor or a processor having more than one core (i.e., a multi-core processor). The security, reliability, and efficient operation of such a device, system, platform, or operating environment may be enhanced by the inclusion and use of the multi-core processor. For example, a multi-core processor may provide the processing performance of multiple processors by executing multiple threads of instruction in parallel while consuming less power, costing less, and using less space than multiple single-core processors.

Operationally, the die of a single core processor may have a power density that is higher in some regions of the die (i.e., hot spots) as compared to other regions of the die. Hot spots may present challenges to efficiently managing thermal and power dissipation aspects of the processor. In some instances, a multi-core processor may have a tendency to have a greater number or intensity of hot spots as compared to a single core processor.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

An apparatus may include a multi-core processor having more than one processor core (also referred to herein as a "core") on a die. The multiple cores may provide a power efficient device, particularly with regard to processing parallel or multithreaded tasks. In some embodiments, the die of a multi-core processor may have one or more regions of increased power density as compared to other regions of the die. The regions of increased power density may be referred to herein as 'hot spots' since the thermal temperature of the die at the regions of increased power density is greater than other regions of the die.

Figure 1:
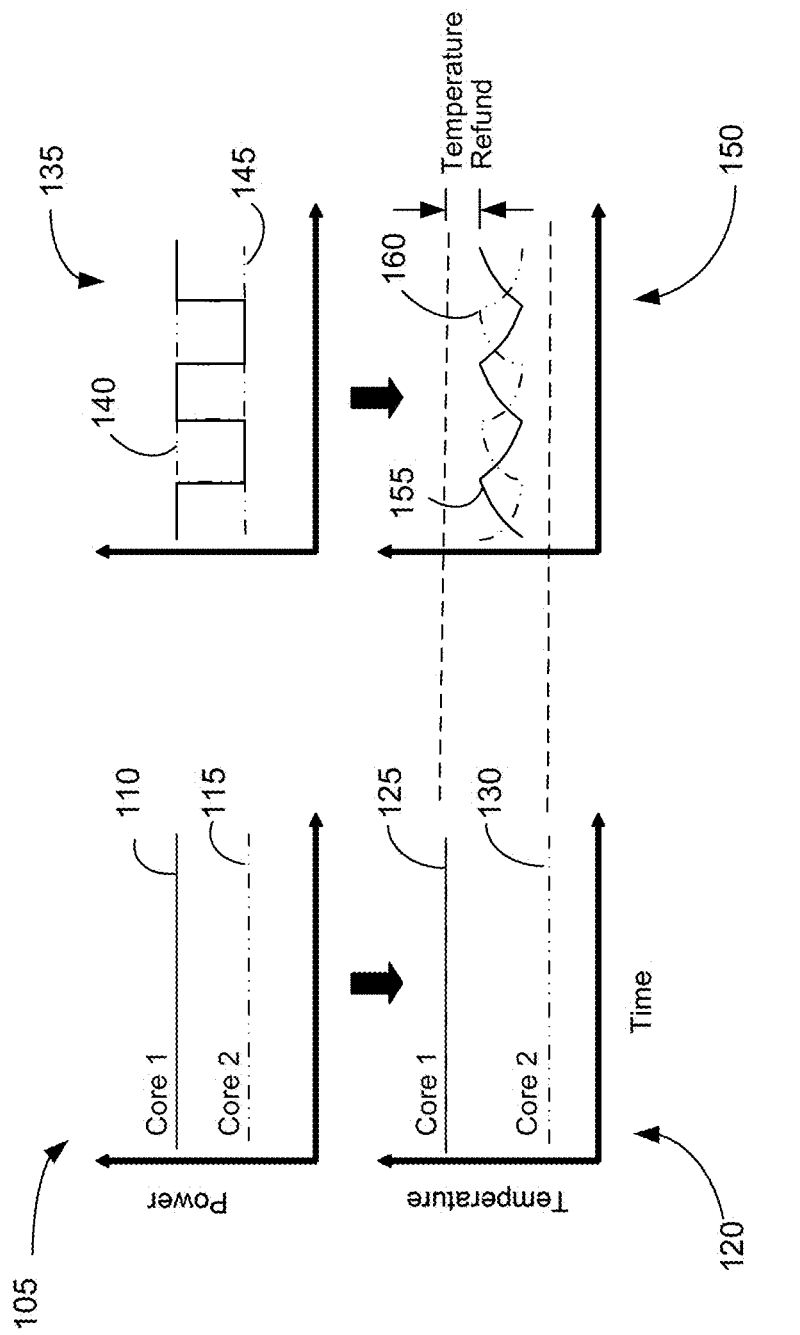
FIG. 1 is an exemplary depiction of operational aspects of an apparatus, in accordance with some embodiments herein.
Figure 2:
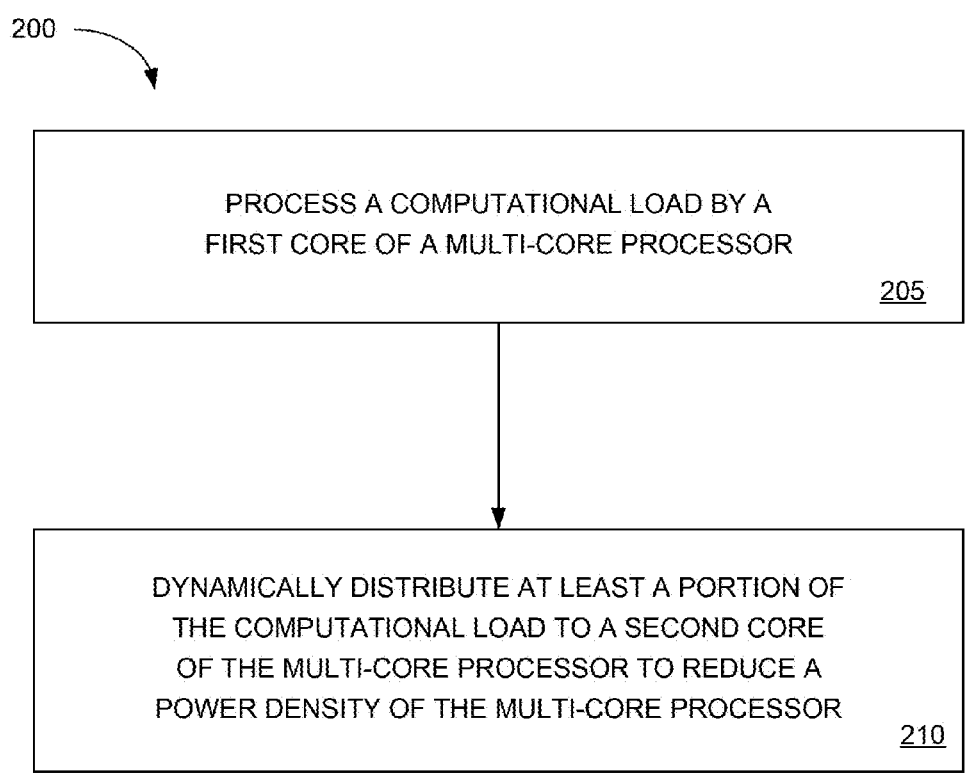
FIG. 2 is a flow diagram of a process, in accordance with some embodiments herein.

FIG. 1 is an exemplary depiction of certain aspects of an apparatus having a multi-core processor including two cores, core 1 and core 2. Graph 105 is a depiction of the multi-core processor with core 1 operating at a first power 110 and core 2 operating at a different, lower power 115. A higher operating power may be an indication of a greater processing function being performed by the core. Graph 120 is a depiction of exemplary temperatures for cores 1 and 2 shown in graph 105. Based on the power of cores 1 and 2, core 1 exhibits a higher operating temperature 125 relative to an operating temperature 130 of core 2. Accordingly, the multi-core processor including core 1 and core 2 may have an increased power density (i.e., hot spot) in a region corresponding to core 2 due to the increased temperature of core 2, as compared to core 1.

In some embodiments, the die of the multi-core processor may have a non-uniform power density due to the variance in temperatures of the cores therein. A non-uniform power density may tend to limit an overall power dissipation from the processor. Further, the occurrence of a non-uniform power density may increase as the number of cores increase for a given die size.

In some embodiments herein, a method, apparatus, system, and article of manufacture may provide mechanisms to distribute the processing power of a multi-core processor across the cores of the multi-core processor die. In general, the mechanisms to distribute the processing power of a multi-core processor across the cores of the multi-core processor may be referred to herein as dynamic thermal management (DTM). By distributing the processing of the multi-core processor between the cores at a sufficiently fast rate, the effective power density on the die may be reduced through a thermal capacitance effect of the cores. The reduced power density may result in a lower die temperature. In some embodiments, the power density may be reduced by a factor that is proportional to the number of cores included in the distribution process.

Referring again to FIG. 1, graph 135 is an exemplary depiction of core 1 and core 2 operating in accordance with some DTM embodiments herein. In graph 135, core 1 and core 2 operate at power 140 and power 145, in a time varying manner. Processing is dynamically distributed between core 1 and core 2. During certain periods of time, core 1 operates at the higher power 140 while core 2 operates at the lower power 145 and during other periods of time core 2 operates at the higher power 140 while core 1 operates at the lower power 145.

In some embodiments, there may be a disparity in a computing time constant of a core (e.g., 1 e−9 seconds to 1 e−6 seconds) and a thermal time constraint of the core (e.g., 1 e−04 seconds to 1 e−1 seconds). Accordingly, a core may be switched on, perform processing operations, and then turned off in a time less than it takes for the core to thermally heat as a result of the processing.

It is noted that a finite period of time is needed for a mass to heat due to a thermal capacitance of the mass. Accordingly, a large power spike for a core over a relatively short period or interval of time will not typically translate to a corresponding large increase in temperature of the core due to the thermal capacitance of the core. In some embodiments, DTM mechanisms herein dynamically distribute processor power of a multi-core processor across multiple cores of the multi-core processor to effectively reduce a heat flux density of the die of the multi-core processor.

bution process is increased (i.e., the denominator in equation 3 is proportional to the number of cores involved in the DTM sequence).

Applicant(s) have realized a DTM control mechanism using, for example, a simulation using a time-varying finite element analysis of a dual core processor package. Certain aspects of such a DTM control mechanism (e.g., a control algorithm) in accordance with embodiments herein may be expressed by the following exemplary programming code.

```
While (DTM = ON)
    HC = index to hottest core;
    CC = index to coolest core:
    If (Power(HC) > Power(CC))    // this condition could be removed and the
    Swap core loads;              //cores swapped regardless of power state and still be
        End                        //an effective controller
    Else
        While (counter < Migration_Period)    // built in timer that defines
                                              //migration frequency
            Check for overtemperature, break if occurs;
            Check DTM Status, break if changes to off
        End
    End
    Check DIM status, break if changes to off
End // while DTM
```

The frequency at which core 1 and core 2 alternate or swap between operating at powers 140 and 145 is faster than a time needed for either of cores 1 and 2 to heat to the temperature 125, as shown in graph 150. As shown, the maximum temperature of core 1 (line 155) and core 2 (line 160) is lower than temperature achieved in graph 1.

The distribution of processing between core 1 and core 2 may result in a reduction of the maximum die temperature in a region of core 1 and core 2 due to the power of the multi-core processor being more evenly distributed across the cores of the die. The reduction of the maximum die temperature is depicted in graph 150 as a temperature refund 165 (e.g., for graph 150, temperature refund=temperature 125−temperature 127).

Temperature refund 165 may be a result of a lower power density of the multi-core processor die. On a time averaged basis, a maximum power density may be expressed by the following equations:

No DTM:

$$\text{Maximum die power density} = Pd\_1 = (P1)/(A) \quad (1)$$

With DTM:

$$\text{Maximum die power density} = Pd\_2 = (P1+P2)/(2A) \quad (2)$$

where Pd_1, P1, and A are the power density, power, and core area for the NO DTM case, respectively. Also, Pd_2, P1, P2, and A are the power density, core 1 power, core 2 power, and core area for the DTM case, respectively.

In some embodiments, a potential relative reduction ratio of the power density between the instances of NO DTM (e.g., graphs 105, 120 and eq. 1) and active DTM (e.g., graphs 135, 150 and eq. 2) may be expressed as a Power Density Reduction Potential (PRPD), as follows:

$$PDRP = (Pd\_1 - Pd\_2)/Pd\_1 = [1 - P2/P1]/2 \quad (3)$$

Figure 3:
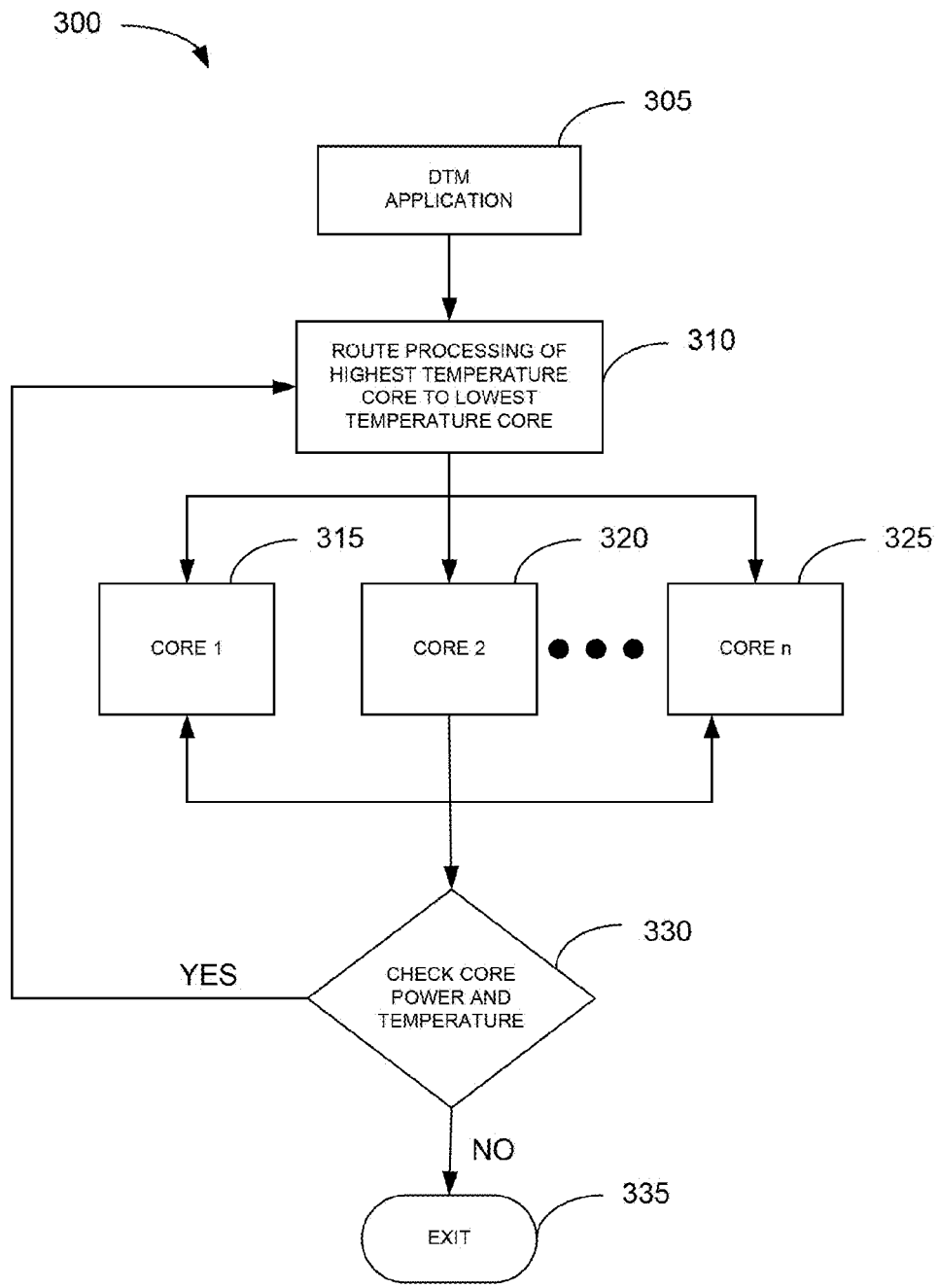
FIG. 3 is a flow diagram of a process, in accordance with some embodiments herein.

Equation 3 suggests that smaller ratios of P2/P1 lead to greater reductions of the power density with a limit of one-half (½) reduction in the power density for a dual core processor. This indicates that a greater benefit may be obtained when a larger disparity between core power states exist or if the core count included in the processing distri- In some embodiments, FIG. 3 is an exemplary flow diagram corresponding to the coded instructions above. It is noted that FIG. 3 may be extended to cover other control schemes in addition to and different than those relating to the above code listing.

At operation 305, a DTM controller or other mechanism is invoked. At operation 310 at least a portion of a computational load being processed by a multi-core processor is routed from a core having a temperature higher than other cores of the multi-core processor to a core having a lower temperature than the other cores. In some embodiments, operation 310 routes processing of the highest temperature core to the lowest temperature core.

Operation 310 includes a basis for the routing of the computational load 305 between the cores of the multi-core processor. In some embodiments, the basis for the routing of the computational load (e.g., an algorithm, basis, relationship, etc.) may include more, fewer, and different factors than the temperature illustrated at operation 310.

For example, the migration period provided in the corresponding code above may be based on a fixed time period (i.e., a fixed rate), may be based on a variable time period that is a function of a core temperature (i.e., a migration frequency that is temperature adaptive), and combinations thereof. In some embodiments, multiple migration frequencies may be used. The migration frequencies may vary in a linear or a non-linear manner from a possible low rate(s) to a high rate(s).

At least a portion of the computational load may be distributed to at least one of the cores 315, 320, 325. In some embodiments, at least a portion of the computational load may be distributed from the core having the highest temperature to the one core having the lowest temperature. The basis for the routing may vary in accordance with the various embodiments herein.

At operation 330, a determination is made whether there is an over-temperature condition for the core(s) processing at least a portion of the computational load. Also, a determination may be made at operation 330 to determine whether the DTM process is still active. In an instance there is an over-temperature condition or the DTM process is not active, process 300 proceeds to exit 335.

In an instance there is not an over-temperature condition and the DTM process is still active, process 300 proceeds to operation 310. At operation 310, at least a portion of the computational load is again routed from a core having a temperature higher than other cores of the multi-core processor to a core having a lower temperature that the other cores. In some embodiments, the rate at which operation 310 is performed is the same as the migration frequency of the DTM process.

Figure 4:
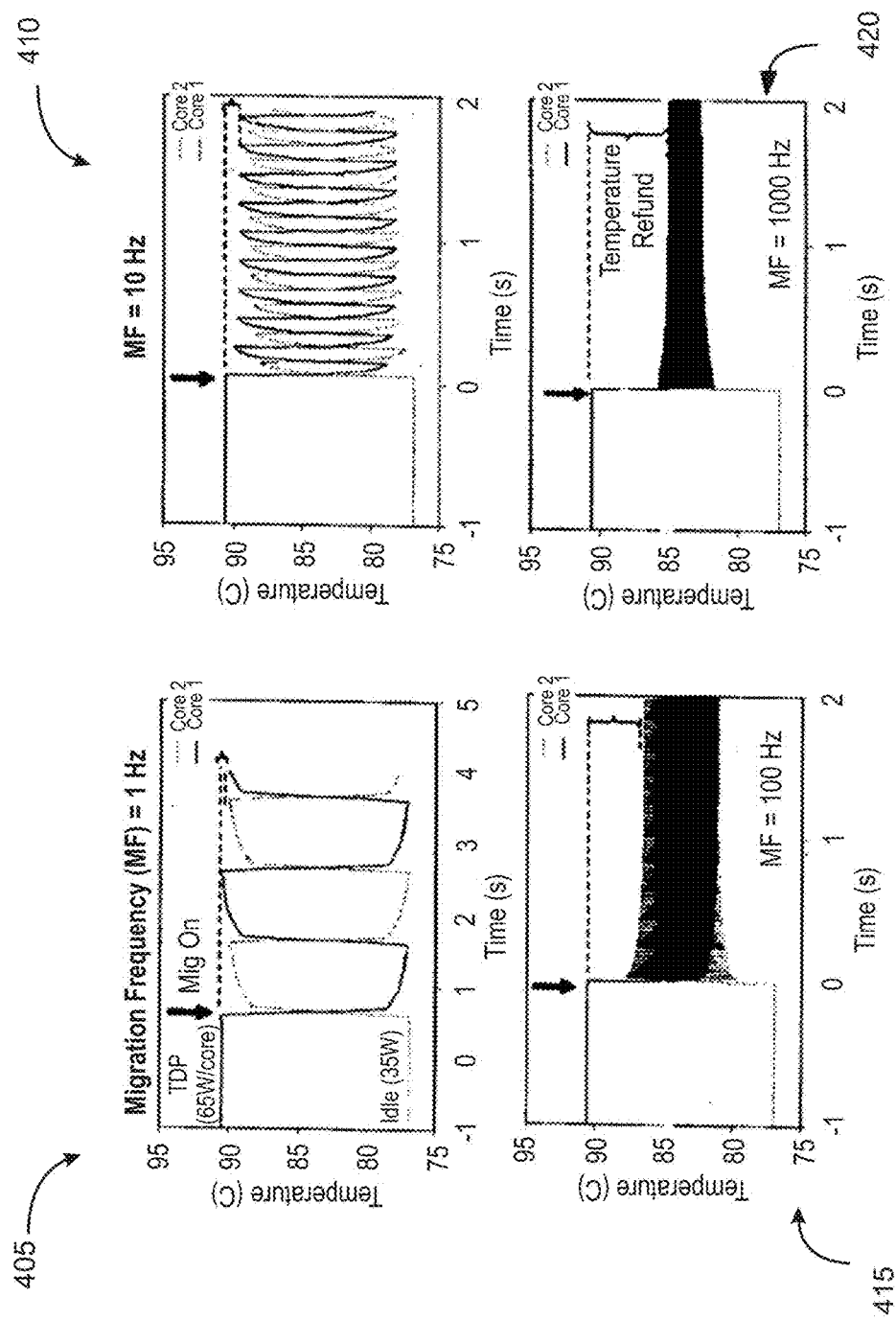
FIG. 4 is an exemplary depiction of characteristics relating to some embodiments herein.

FIG. 4 is an exemplary depiction of two cores, core 1 and core 2, operating under various conditions per a DTM mechanism, in accordance herewith. In the examples shown in graphs 405, 410, 415, and 420 a dual core processor is depicted. Core 1 is operating at 65 watts (W) and core 2 is in an idle state of 35 W. The difference in core power is referred to herein as the migration amplitude (MA) of the cores and represents an opportunity to exchange power between the two cores. In this instance, the MA is 30 W. For each of graphs 405, 410, 415, and 420, a temperature response for the cores under an active DTM condition is shown. For graph 405 the MF (migration frequency)=1 Hz, for graph 410 the MF=10 Hz, for graph 415 the MF=100, and for graph 420 the MF=1000 Hz.

A temperature refund is equal to the overall reduction in the instantaneous peak temperature that may be achieved by initiating the DTM mechanism at time=0 seconds. As illustrated, a higher load MF is more effective at distributing the heat over the two cores. For example, at the MF=100 Hz there is about a 4.5° C. temperature reduction in the maximum die temperature and at MF=1000 Hz the temperature reduction increases to nearly 6° C. It is noted that the thermal budget for a processor package may be, for example, about 25° C. to 30° C. (at 130 W). Thus, a temperature refund provided in accordance herewith by DTM mechanisms may represent an effective 20%-25% improvement in the thermal performance of an processor package.

Figure 5:
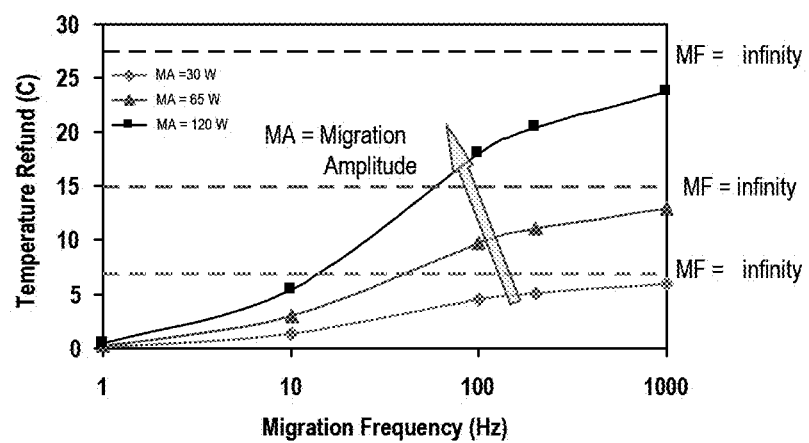
FIG. 5 is an exemplary depiction of characteristics relating to some embodiments herein.

FIG. 5 is an exemplary summary representation 505 illustrative of how a temperature refund scales with a load migration amplitude (MA) and a load migration frequency (MF). In particular, the temperature refund increases with both migration amplitude and migration frequency. In instances where large migration amplitudes are available (e.g., 50 W-120 W), a reduction of about over 20° C. may be achieved using migration frequencies between 100-1000 Hz. Accordingly, DTM mechanisms in accordance with some embodiments herein may be used to enhance scalar computing performance of multi-core processors. Furthermore, DTM mechanisms in accordance with some embodiments herein may be used without impacting parallel applications performance that may use both (multiple) cores simultaneously to obtain the highest throughput.

In some embodiments, a DTM mechanism in accordance herewith may provide improved scalar computing. In some embodiments, an individual core frequency may be increased, thereby providing improved performance on scalar tasks. Also, the multi-core architecture of the processor may still be utilized for high throughput in applications with, for example, high levels of parallelism. That is, an adaptive nature of the DTM mechanisms herein may enable high scalar performance without impacting high throughput during parallel applications.

In some embodiments, the DTM mechanisms in accordance herewith may be adaptive in the sense that such features may be selectively activated. For example, a hardware implemented DTM control may be selectively turned on and turned off by an operating system (O/S) of a device or system.

Figure 6:
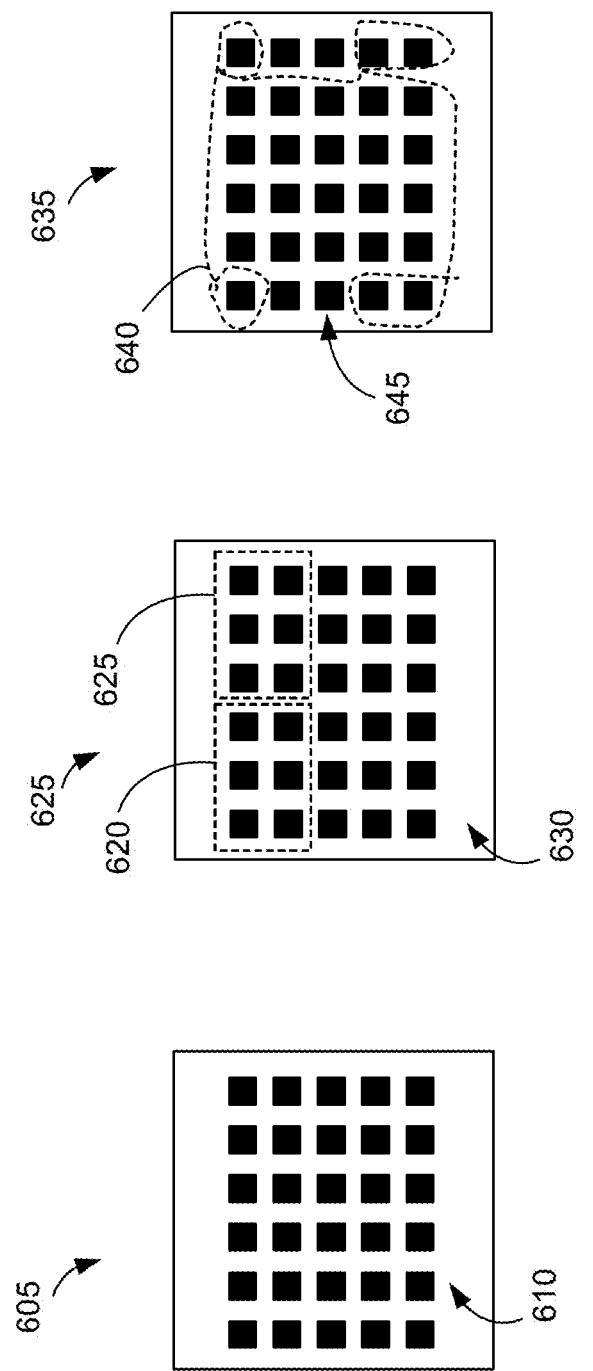
FIG. 6 is an exemplary depiction of multi-core processors, in accordance with some embodiments herein.

FIG. 6 is an exemplary depiction illustrating adaptive aspects of a DTM mechanism, in accordance with embodiments herein. FIG. 6 includes three configurations of a multi-core processor or array of cores. In particular, there is shown a multi-core processor 605 having uniform array of cores 610, all cores therein operating at frequency, f.

Also shown is a multi-core processor 615 including an array of cores 630 wherein a number of cores 630 are grouped into two clusters 620 and 625. Clusters 620 and 625 may, under the control of a DTM mechanism in accordance herewith, operate as superscalar clusters that are selected from adjacent cores 630. Clusters 620 and 625 may operate at a higher frequency than the remaining cores of multi-core processor 615 not included in clusters 620 and 625. For example, clusters 620 and 625 may operate at a frequency=f+Δf, while the cores not included in clusters 620 and 625 operate at a frequency=f. Clusters 1 and 2 may operate at the higher frequency (f+Δf) without increasing the power dissipation of multi-core processor 615 in accordance with the DTM mechanism disclosed herein.

Multi-core processor 635 may operate under control of a DTM mechanism in accordance herewith to form a cluster 640. Cluster 640 is formed by a grouping of non-adjoining cores 645. Cores of cluster 640 may be operated at a higher frequency than the cores not included in the cluster since the cores of cluster 640 have the computational load being processed by the cluster dynamically distributed amongst the cores of the cluster, in accordance with embodiments herein.

In some embodiments, clusters 620, 625, and 640 may operate as a superscalar core. When, for example, the need for the superscalar cores 620, 625, and 640 are no longer needed (i.e., no longer processing scalar tasks), the DTM functionality associated with multi-core processors 515 and 520 may be turned off and the clustered cores returned to the collective array of core.

In some embodiments, the number of cores included in a cluster may vary. For example, a cluster may include at least two cores. The clustered cores may be adjoining, non-adjoining, and combinations thereof. In some embodiments, the configuration or groupings of cores may be predetermined or vary in accordance with operational contexts. For example, the number of cores included in a cluster(s) may depend on the number of cores available for clustering, the power to be dissipated, the computational tasks and/or computational load being processed, and other factors.

Figure 7:
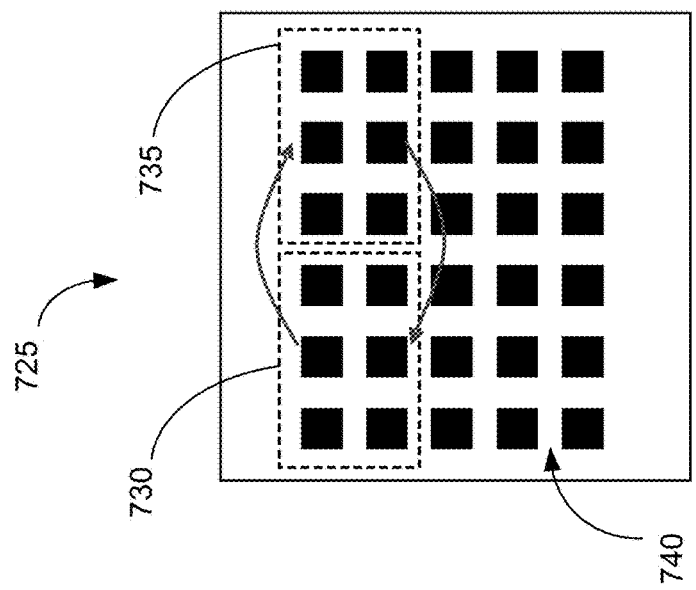
FIG. 7 is an exemplary depiction of multi-core processors, in accordance with some embodiments herein.
Figure 7:
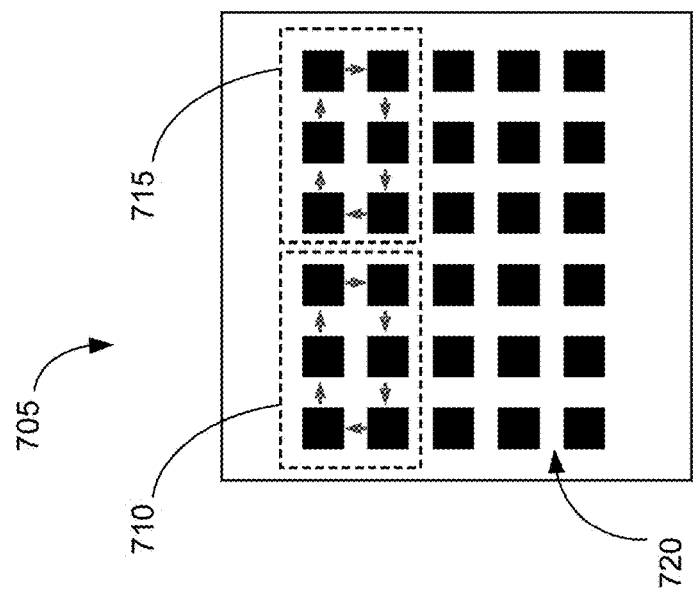

FIG. 7 is an exemplary depiction illustrating adaptive aspects of DTM mechanisms, in accordance with embodiments herein. For example, multi-core processor 705 having a plurality of cores 720 includes two clusters of cores grouped as cluster 710 and cluster 715. Regarding clusters 710 and 715, a DTM mechanism in accordance herewith may be invoked to dynamically distribute the processing of a computational load among cores within a cluster (indicated by the arrows within the cluster). In some embodiments, DTM mechanisms may be used to distribute processing amongst the cores within cluster 610 and DTM mechanisms may also be used to control to distribute processing amongst the cores within cluster 715. The cores in clusters operate 710 and 715 may operate at a substantially higher frequency than the cores not in the cluster, in accordance with the aspects of DTM disclosed herein.

Multi-core processor 725 having a plurality of cores 740 includes two clusters of cores, cluster 730 and cluster 735. For clusters 730 and 735, a DTM mechanism in accordance herewith may be invoked to dynamically distribute the processing of a computational load across the clusters (indicated by the arrows between the clusters). In some embodiments, DTM mechanisms may be used to distribute processing between clusters 730 and 735. Here, the cores in clusters 730 and 735 may operate at a substantially higher frequency than the cores not in the cluster.

Thus, a DTM mechanism may be applied to clusters cores in a variety of manners, including amongst cores within clusters (multi-core 605), between clusters (multi-core processor 625), and a combination thereof (not shown).

Figure 8:
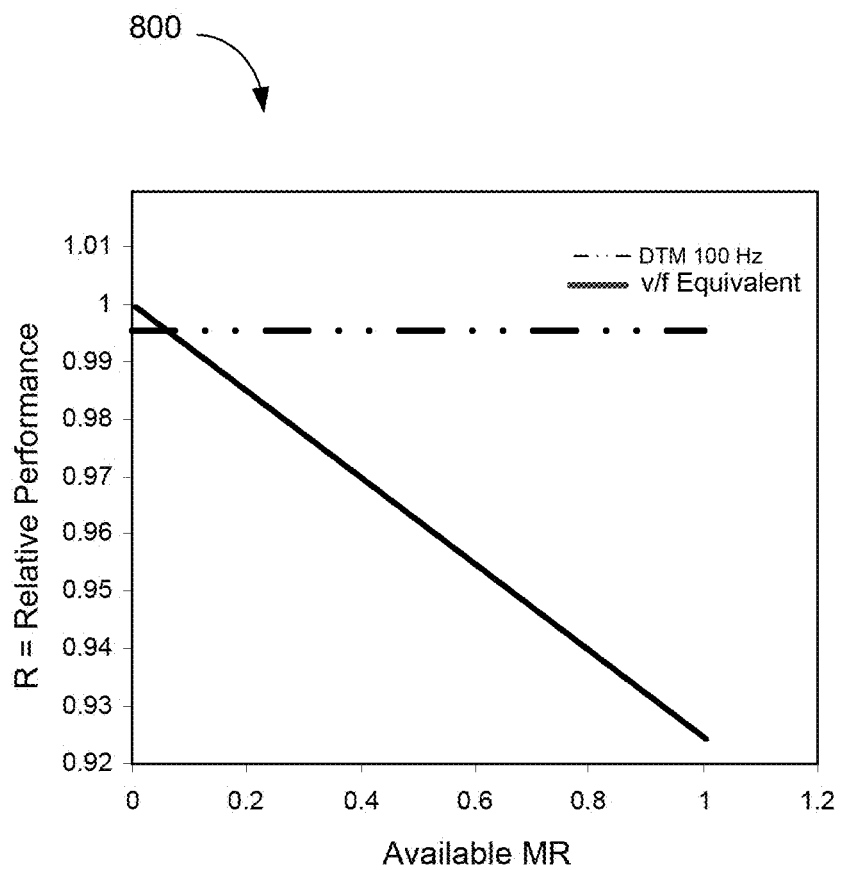
FIG. 8 is an exemplary depiction of characteristics relating to some embodiments herein.

In some embodiments, aspects of the DTM mechanisms herein may be used as a throttle mechanism to correct for over temperature event. Over temperature events may occur in a device or system due to, for example, poor platform thermal management solutions otherwise employed in the device or system. In some embodiments, the migration frequency associated with a DTM mechanism may act as a throttle control. The temperature of the multi-core processor may be reduced as migration frequency increases, even though there may typically be more computation overhead at a higher migration frequency. FIG. 8 illustrates an exemplary comparison of the relative performance of a DTM mechanism and voltage/frequency throttling, over a range of available migration ratios, to reduce a temperature of a multi-core processor.

Note that the migration ratio (MR) represents the amount of heat that is available to be migrated between cores, and MR=1−(Low power core Watts)/(High power core Watts). Also, at MR=0, there is no opportunity to migrate heat between cores and at MR=1 there is full (100%) opportunity to migrate heat between cores. For some multi-core processors, MR=about 0.6 to about 1.0 may be typical.

Referring to FIG. 8, data in graph 700 are for equivalent levels of temperature reduction. The data shows that a DTM mechanism operating at 100 Hz has a lower performance penalty than voltage/frequency (v/f) scaling for a wide range of MR values. The graphed data suggests that DTM mechanisms in accordance with some embodiments herein may be a more effective throttle mechanisms than a v/f scaling approach.

In some embodiments, a temperature refund obtained through the use of a DTM mechanism may be used to lower an acoustic emission of a device or system having a multi-core processor and a cooling device that produces acoustic emissions (e.g., a fan). An example of such a system may include a personal computer having a multi-core processor and at least one cooling fan. The lowering of the acoustic emissions may be the sole purpose for invoking the DTM mechanism and, in some embodiments, invoking the DTM mechanism may also at least contribute to increasing the power and performance of the multi-core processor.

In some embodiments, a temperature refund is used to lower the revolutions per minute (RPM) of a cooling processor fan until a desired temperature is reached. The desired temperature may be equivalent to the temperature the processor would achieve in the absence of activating or including the DTM mechanism. In this manner, the processor is not allowed to operate at a temperature any worse than it would normally operate (i.e., within design specifications). The lower fan RPMs may significantly lower a noise signature of the device or system including the multi-core processor and cooling fan.

Figure 9:
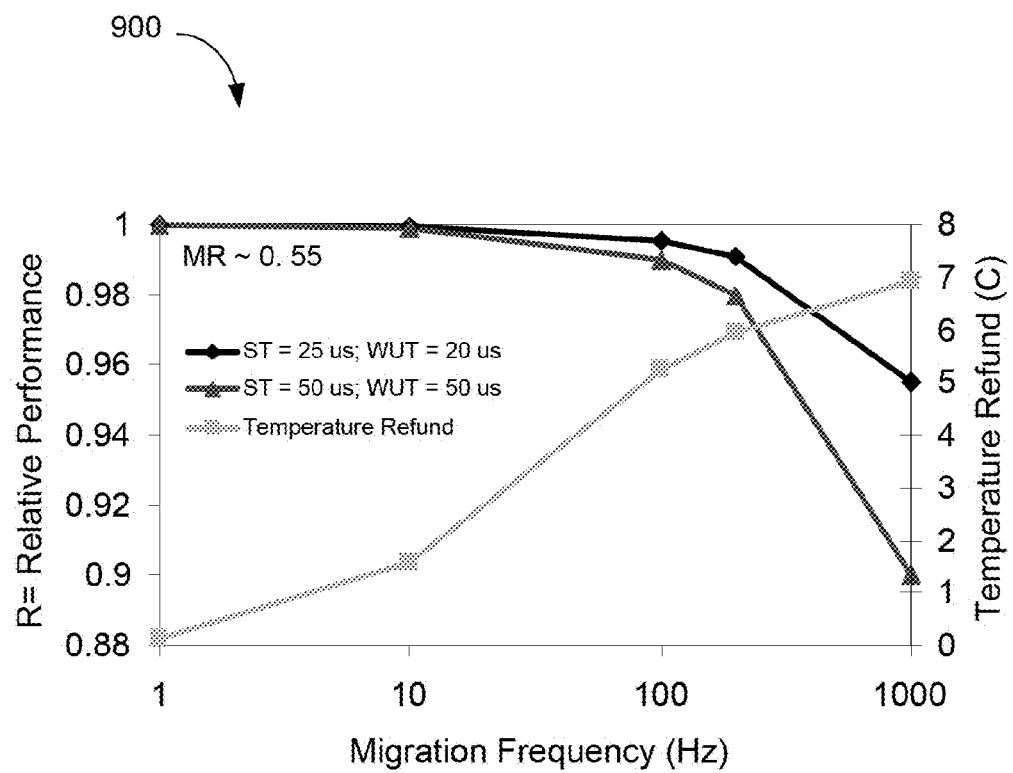
FIG. 9 is an exemplary depiction of characteristics relating to some embodiments herein.

FIG. 9 is an exemplary graph 900 illustrating that there is a small degradation in performance due to penalties accrued by switching the core context (ST penalty) and warming up the core (WUT penalty). However, a significant temperature reduction may be achieved. It is expected that a 5° C. temperature translates to about a 0.5 BA of acoustic noise.

As illustrated, the temperature reduction is reached with the DTM mechanism operating at about 100 HZ, suggesting for example that acoustic emission reduction using DTM mechanism may be used to implement a "whisper" mode of operation for processor based devices and systems.

In some embodiments, the DTM mechanism control may be applied by a user (e.g., end-user, technician, etc.). In some embodiments, the DTM mechanism for acoustic reduction could be invoked for a "whisper" mode of operation, turned off for typical processing applications, and invoked to increase power or performance of the multi-core processor in a "turbo" ode of operation.

In some embodiments, a DTM mechanism in accordance herewith may be used to a reduce leakage power of a processor. This aspect of some DTM mechanism herein may be particularly suited, though not limited to, mobile applications where battery life is highly valued.

In an instance a multi-core processor is operating without DTM mechanisms in accordance with embodiments herein, an active core may produce (severe) hot spots in the region of the active core. Accordingly, the leakage power of the active core is reflected in a higher temperature field.

It is noted that leakage power may be a highly nonlinear function of temperature. Thus, a hot spot caused by an active core may result in a large or significant leakage power.

In an instance a multi-core processor is operating with DTM mechanisms activated and processing of a computational load is dynamically distributed among multiple cores in accordance with embodiments herein, active cores may avoid producing hot spots. The resultant heat spreading may produce a lower temperature field. Accordingly, the leakage power for the multi-core processor may correlate to a lower temperature environment. Also, due to the temperature dependence of the leakage power the overall leakage power may be lowered, thereby extending, for example, battery life of a mobile device. In some embodiments, a leakage power savings on the order of about 5 to about 10 watts may be expected.

In some embodiments, a dynamic distribution of processor power of a multi-core process across multiple cores of the multi-core processor is accomplished at a frequency (e.g., a migration frequency) sufficiently fast to distribute the power over the cores and reduce the power density, and yet only increases a computational overhead a relatively small amount.

Figure 10:
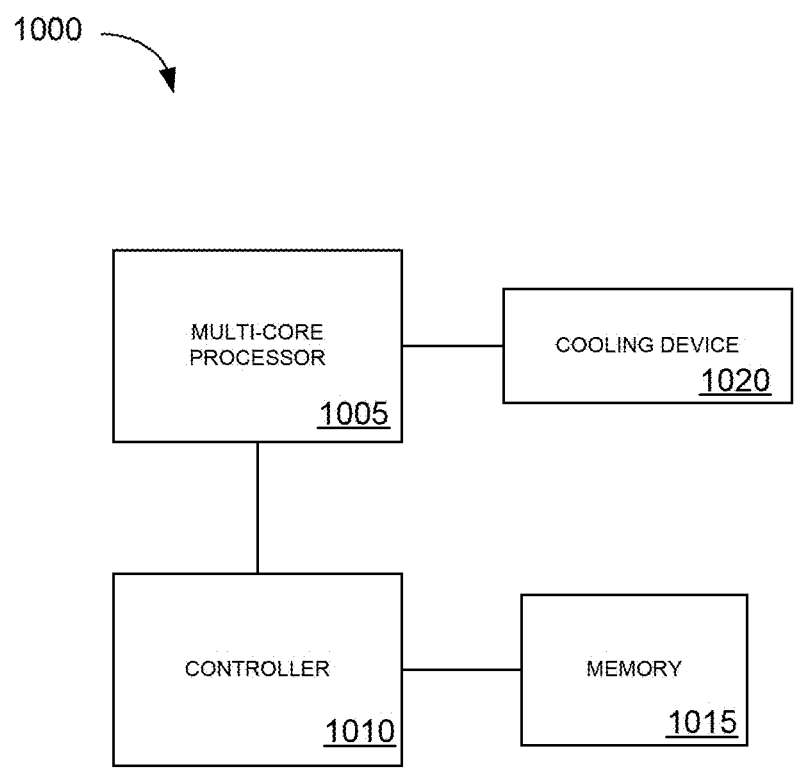
FIG. 10 is an exemplary depiction of a system, according to some embodiments herein.

FIG. 10 is an exemplary depiction of a system 1000 including an apparatus, for example a multi-core processor 1005 in communication with a controller 1010. A memory 1015 is attached to controller 1010 by a conductor and other electrical connections. Cooling device 1020 may be provided to at least cool multi-core processor 1005.

Controller 1010 may include a hardware implemented DTM mechanism, in accordance herewith. In some embodiments, code or program instructions may be stored in controller 1010 and further executed by the controller to effectuate the DTM mechanisms herein. In some embodiments, at least a portion of memory 1015 may be used to store code or program instructions used by controller 1010, an operating system, and other information.

Those in the art should appreciate that system 1000 may include additional, fewer, or alternative components to multi-core processor 1005, controller 1010, memory 1015, and cooling device 1020.

In some embodiments, cooling device 1020 may include a fan. Memory 1015 may comprise any type of memory for storing data, including but not limited to a Single Data Rate Random Access Memory, a Double Data Rate Random Access Memory, or a Programmable Read Only Memory.

It should be appreciated that the drawings herein are illustrative of various aspects of the embodiments herein, not exhaustive of the present disclosure.

What is claimed is:

1. At least one non-transitory machine accessible storage medium having instructions stored thereon, the instructions when executed on a machine, cause the machine to:
   determine temperature characteristics of a first processor core and a second processor core in a plurality of processor cores on a die;
   determine a variation between the temperature characteristics of the first processor core and temperature characteristics of the second processor core; and
   perform dynamic distribution of a computational workload between the first processor core and the second processor core based on the variation, wherein the dynamic distribution is controlled by an operating system (OS), the dynamic distribution of the computational workload comprises redistributing workload from the first processor core to the second processor core based on the first processor core having an operating temperature that is higher than the second processor core, the computational workload is to be distributed according to a frequency based on respective thermal time constants of each of the first processor core and the second processor core, and the frequency is varied over time as a function of the temperature characteristics of at least one of the first processor core and the second processor core.

2. The at least one non-transitory machine accessible storage medium of claim 1, wherein the frequency causes the computational workload to be distributed to the first processor core for intervals shorter than the thermal time constants of both the first processor core and the second processor core.

3. The at least one non-transitory machine accessible storage medium of claim 1, wherein the frequency being varied over time as the function of the temperature characteristics of the at least one of the first processor core and the second processor core comprises:
   initiating the dynamic distribution at the frequency; and
   increasing the frequency over time based on an increase in the temperature characteristics of the first processor core.

4. The at least one non-transitory machine accessible storage medium of claim 1, wherein the first processor core and the second processor core are included in a same cluster of processor cores comprising a subset of the plurality of processor cores and the dynamic distribution of the computational workload comprises cyclically redistributing workload to each processor core in the same cluster of processor cores.

5. The at least one non-transitory machine accessible storage medium of claim 1, wherein determining the variation between the temperature characteristics of the first processor core and the second processor core comprises determining a difference between the operating temperature of the first processor core and an operating temperature of the second processor core.

6. The at least one non-transitory machine accessible storage medium of claim 5, wherein the dynamic distribution is performed based on the difference.

7. A method comprising:
   determining temperature characteristics of a first processor core and a second processor core in a plurality of processor cores on a die;
   determine a variation between the temperature characteristics of the first processor core and temperature characteristics of the second processor core; and
   using an operating system to perform dynamic distribution of a computational workload between the first processor core and the second processor core based on the variation, wherein the dynamic distribution of the computational workload comprises redistributing workload from the first processor core to the second processor core based on the first processor core having an operating temperature that is higher than the second processor core, the computational workload is to be distributed according to a frequency based on respective thermal time constants of each of the first processor core and the second processor core, and the frequency is varied over time as a function of the temperature characteristics of at least one of the first processor core and the second processor core.

8. The method of claim 7, wherein the frequency causes the computational workload to be distributed to the first processor core for intervals shorter than the thermal time constants of both the first processor core and the second processor core.

9. The method of claim 7, wherein determining temperature characteristics of the first processor core and the second processor core comprises determining a difference between the operating temperature of the first processor core and an operating temperature of the second processor core.

10. The method of claim 9, wherein the dynamic distribution is performed based on the difference.

11. A system comprising:
    a die comprising a plurality of processor cores;
    an operating system to utilize the plurality of processor cores; and
    an operating system-level hot spot mitigation tool to:
      determine a difference in temperatures between a first processor core and a second processor core in the plurality of processor cores; and
      perform dynamic distribution of a computational workload between the first processor core and the second processor core based on the difference, wherein the dynamic distribution of the computational workload comprises redistributing workload from the first processor core to the second processor core based on the first processor core having a temperature that is higher than the second processor core, the computational workload is to be distributed according to a frequency based on respective thermal time constants of each of the first processor core and the second processor core, and the frequency varied over time as a function of the temperature of at least one of the first processor core and the second processor core.

12. The system of claim 11, wherein the frequency causes the computational workload to be distributed to the first processor core for intervals shorter than the thermal time constants of both the first processor core and the second processor core.

13. The system of claim 11, further comprising a cooling fan.

14. The at least one non-transitory machine accessible storage medium of claim 1, wherein the first processor core is included in a first cluster of processor cores comprising a subset of the plurality of processor cores, the second processor core is included in a second cluster of processor cores comprising a different subset of the plurality of processor cores, and the dynamic distribution of the computational workload comprises redistributing workload from the first cluster of processor cores to the second cluster of processor cores.

15. The method of claim 7, wherein the frequency being varied over time as the function of the temperature characteristics of the at least one of the first processor core and the second processor core comprises:

initiating the dynamic distribution at the frequency; and increasing the frequency based on an increase in the temperature characteristics of the first processor core.

16. The method of claim 7, wherein the first processor core and the second processor core are included in a same cluster of processor cores comprising a subset of the plurality of processor cores and the dynamic distribution of the computational workload comprises cyclically redistributing workload to each processor core in the same cluster of processor cores.

17. The method of claim 7, wherein the first processor core is included in a first cluster of processor cores comprising a subset of the plurality of processor cores, the second processor core is included in a second cluster of processor cores comprising a different subset of the plurality of processor cores, and the dynamic distribution of the computational workload comprises redistributing workload from the first cluster of processor cores to the second cluster of processor cores.

18. The system of claim 11, wherein the frequency being varied over time as the function of the temperature of at least one of the first processor core and the second processor core comprises the operating system-level hot spot mitigation tool to:

initiate the dynamic distribution at the frequency; and increase the frequency based on an increase in the temperature of the first processor core.

19. The system of claim 11, wherein the first processor core and the second processor core are included in a same cluster of processor cores comprising a subset of the plurality of processor cores and the dynamic distribution of the computational workload comprises cyclically redistributing workload to each processor core in the same cluster of processor cores.

20. The system of claim 11, wherein the first processor core is included in a first cluster of processor cores comprising a subset of the plurality of processor cores, the second processor core is included in a second cluster of processor cores comprising a different subset of the plurality of processor cores, and the dynamic distribution of the computational workload comprises redistributing workload from the first cluster of processor cores to the second cluster of processor cores.

* * * * *